3,031,425
FLAME RESISTANT POLYESTER COMPOSITIONS CONTAINING ANTIMONY

Blaine O. Schoepfle, Niagara Falls, N.Y., and Paul Robitschek, Granville, Ohio, assignors to Hooker Chemical Corporation, Niagara Falls, N.Y., a corporation of New York
No Drawing. Filed Oct. 4, 1957, Ser. No. 688,111
27 Claims. (Cl. 260—28.5)

This invention relates to flame resistant polyester compositions, and more particularly to such compositions containing organic flame-retarding agents soluble therein.

Synthetic resins such as polyester resins have found wide-spread use throughout industry, in ever increasing amounts. However, one of the most formidable deterrents to an even greater development has been their tendency to ignite and burn when placed in contact with a flame. The general trend of the research devoted to this problem has been toward the goal of producing a composition which will not burn at all or a composition which although it may still burn when held in a flame, will extinguish itself when the flame is removed.

Various methods have been used by experimenters in the field to diminish the flammability of the polyester resin. One method has been to introduce combined halogen into the polyester molecule itself. One example of this is the polyester formed by first producing the hexachlorocyclopentadiene adduct of maleic anhydride and esterifying it in the presence of an additional amount of maleic anhydride with a glycol such as ethylene glycol, after which the polyester may be cross-linked by any of the common cross-linking agents, such as styrene, in the presence of a polymerization catalyst. This method has resulted in a material which has a very high degree of flame-resistance. Other polyesters have been made by utilizing tetrachlorophthalic anhydride as the acid component of the polyester molecule.

Another method for producing flame-resistant polyester composition has been to provide a physical mixture of a non-halogen-containing polyester with a chlorinated paraffin wax. This has increased the flame-resistance of the composition materially, although not to the degree enjoyed by the combined-chlorine-containing polyester resin, but has done this to the detriment of other desirable properties.

Some of these compositions, especially the combined-halogen-containing such as chlorine-containing, polyesters have been found suitable for a great many purposes where flame-resistance is desirable. However, for some uses, such as in the building trades, it has been found desirable to increase the flame-resistance of the polyester resin even to a higher degree than that already possessed by even the combined-halogen-containing polyesters. In order to accomplish this, as disclosed in copending application Serial No. 450,217, filed August 16, 1954, now U.S. Patent No. 2,909,501, it was found to be effective to incorporate a small amount of antimony trioxide into the polyester resin. This succeeded in considerably increasing flame-resistance over that of the chlorinated polyester or the chlorinated paraffin wax containing-polyester alone; however, it was found that the introduction of antimony trioxide rendered the final molded product almost opaque, rendering it useless for applications where a transparent finished product or one having a high degree of light transmission was desired.

It is an object of the present invention to provide a polyester resin composition which has a very high degree of flame-resistance. It is a further object of this invention to provide a flame-retardant agent which will increase the flame-resistance of both halogen-containing and non-halogen-containing polyester resins. It is a further object of this invention to provide a flame-retardant agent which will increase the flame-resistance of chlorinated paraffin wax containing polyester resins. It is a further object of this invenition to provide such flame-retardant agents which do not appreciably diminish the light transmission of the cured polyester composition. It is a further object of this invention to provide such a flame-resistant agent which will not inhibit the final polymerization and cure of the polyester resin composition to the extent that it renders its use impractical. Further objects and advantages of the invention will appear more fully from the following description.

It has now been found that the flame-resistance of polyester resin compositions which contain copolymerizable unsaturation, said compositions also containing either combined chlorine within the polyester molecule or within the cross-linking agent therefor or both or which contain an admixture of a combined-chlorine-containing additive may be rendered even more flame-resistant in the finally cured state, while at the same time retaining its light transmitting properties, by the incorporation into the composition, prior to the curing process of an organic antimony compound which is soluble therein and which has the formula:

wherein Sb is trivalent antimony and R is selected from the group consisting of anions of organic acids and alcoholates and mixtures thereof. Beside the compounds designated by the above formula, it has been found that the addition products of the above compounds designated by the formula:

wherein Sb is pentavalent antimony and R is selected from the group consisting of anions of organic acids and alcoholates and mixtures thereof and wherein X is a halogen selected from the group consisting of fluorine, chlorine, bromine and mixtures thereof may also be used.

The flame-retarding agents of this invention do not adversely affect the curing characteristics of the materials to which they are added. It has also been found that the incorporation of the soluble antimony compounds of the present invention does not appreciably diminish the light transmitting properties of the cured polyester resin. This is an important factor where the cured products are to be used in the building trades where high light transmission is desired for many particular applications.

The halogen-containing polyester compositions, such as chlorine-containing, which may be utilized in the practice of the present invention, fall generally within two different classes. In the first class the halogen is chemically combined in the polyester molecule itself, or in the cross linking monomer or both. The second class contains those compositions where the halogen is chemically combined with a filler or an additive. This classification does not preclude the possibility of utilizing an admixture of both the first and second class with the additives of this invention in order to obtain an improved fire resistant resin.

The first class may be further subdivided into three different types of halogen-containing polyester compositions. In the first type the halogen, e.g. chlorine, is present in the form of a chlorinated adduct such as of the polycarboxylic acid, anhydride or alcohol. One example of this type is 1,4,5,6,7,7-hexachlorobicyclo-(2.2.1)-5-heptene-2,3-dicarboxylic anhydride which is the adduct formed by reacting about equimolar amounts of hexachlorocyclopentadiene with maleic anhydride. This is then esterified with a glycol in the presence of additional maleic anhydride and finally cured in the presence of a polymerizable ethylenically unsaturated monomer, such as styrene, in the presence of a polymerization catalyst. Similarly in the first type the halogen can be contained in the glycol component of the polyester as for example by the use of 1,4,5,6,7,7-hexachlorobicyclo-(2.2.1)-5-heptene-2,3-diol.

The second type of the first class which has enjoyed some commercial success is the composition where the polybasic acid itself is chlorinated. An example of this is the polyester which comprises the reaction product of tetrachlorophthalic anhydride with a glycol in the presence of an additional unsaturated acid to provide double bonds for cross-linking and a polymerizable monomer such as styrene and a polymerization catalyst.

The third type of the first class comprises polyester compositions which contain a chlorinated cross-linking agent. Among such chlorinated cross-linking agents are the various chlorinated styrenes, e.g. mono, di and the trichlorostyrenes and certain adducts of hexahalocyclopentadiene.

The compositions of the second class, those which contain the chlorine combined in the additive or filler, can be illustrated by the resin composition comprising the polyester made from phthalic anhydride, maleic anhydride, and a glycol, to which is added chlorinated paraffin wax, styrene and a polymerization catalyst.

The flame-retardant agents of the present invention are of two general types. The first type comprises antimony salts of organic acids, mixed acids, and their pentavalent derivatives. The second type comprises organic esters of antimonous acid and their pentavalent derivatives.

Among the first type are such compounds as antimony acetate, antimony butyrate, antimony valerate, antimony caproate, antimony heptylate, antimony caprylate, antimony caprylate dibromide, antimony pelargonate, antimony caprate (trivalent), antimony caproate dicaprylate, antimony 2-ethyl caproate, antimony naphthenate, etc., and aryl and aralkyl acid salts such as antimony cinnamate are included.

The second type comprises esters of antimonous acid, mixed esters, and their pentavalent derivatives. Among such esters are those made by reacting an epoxide with antimony trichloride to give a β-chloro antimonous acid. Some examples of these β-chloro compounds are tris(2-chloroethyl) antimonite, tris(2-chlorobutyl) antimonite, tris(2-chloro-2-phenylethyl) antimonite, etc. Also among such esters are those made by the reaction of organic hydroxy compounds with antimony trioxide or antimony trichloride. Some examples of these are as follows: tris-(2-ethylhexyl) antimonite, tris(n-octyl) antimonite, tribenzyl antimonite, triphenyl antimonite, etc. In addition, the halogen addition products of the esters may also be used among which are tris(2-chloroethoxy) antimony dibromide, tris(2-chloropropoxy) antimony dibromide, tris-(2,3-dichloropropoxy) antimony dibromide, tris(2-chlorobutoxy) antimony dibromide, tris(2-chloroethoxy) antimony dichloride, tris(2-chloropropoxy) antimony dichloride, tris(2,3-dichloropropoxy) antimony dichloride, tris-2-chlorobutoxy) antimony dichloride, tris(2-ethylhexoxy) antimony dibromide, tris(n-octoxy) antimony dibromide, tribenzoxy antimony dibromide and fluoro addition products of the above.

The choice of compounds selected from the groups defined above is not especially critical. However, in order that the final cured resinous composition will be transparent, an antimony compound must be chosen that is soluble in the particular polyester resin. The size of the organic antimony compound molecule is critical to the extent that as the ratio of hydrocarbon atoms to antimony within the molecule increases, additional flammable material is introduced into the molecule, and a point may be reached where the flammability introduced will equal the flame-resistance imparted by the antimony component of the molecule. At this point the additives will lose their effectiveness. The most effective compounds with respect to the weight of the additives are those derived from low molecular weight organic compounds since the flame-resistance is proportional to the amount of the antimony within the compound. With respect to the antimony salts of organic acids, little is to be gained by using acid moieties of these salts which have greater than 12 carbon atoms.

With respect to the alcohols which may be used to form esters of antimonous acids, alkyl alcohols having from about four carbons to about 12 may be used. The lower alcohols are difficult to use as they hydrolize readily. However this tendency to hydrolyze may be reduced by forming the corresponding pentavalent halogen derivatives. Alkyl alcohols seem to give the best results although aralkyl alcohol such as benzyl alcohol or aryl alcohols such as phenols and substituted phenols are useable, as well as mixtures of the above types. Among the most useful esters of antimonous acid are those formed by the reaction of epoxides with antimony trichloride. This reaction offers a large field of such esters. Such epoxides include ethylene oxide, butylene oxide, epichlorhydrin, propylene oxide, styrene oxide, butadiene monoxide, etc. The esters formed may be used either in the state in which they are formed or in the form of the halo addition product of same, etc.

The flame-resistant agent of the present invention is used in amounts of at least about 0.5 percent by weight of the total polyester composition. As little as three percent has a very appreciable effect in making the composition more flame-resistant. Five percent of the additive in most cases will impart excellent flame-resistance. As much as ten percent or even more may be used where extremely high flame-resistance is desired. However, when a very large percentage of the flame retardant agent is used the product may suffer deterioration in some of its physical properties; therefore, prudence in selecting the amount is recommended. The fire resistance imparting agents of the present invention may be incorporated by any method known to the art, and are generally incorporated by physical mixing with the liquid polyester composition. The composition may then be cured in the normal manner.

Example 1 illustrates the preparation of a polyester resin wherein the polycarboxylic compound portion of same is the hexachlorocyclopentadiene adduct of maleic acid.

*Example 1*

An unpolymerized liquid unsaturated polyester resin was prepared by esterifying about 159 parts of ethylene glycol with about 389 parts of 1,4,5,6,7,7-hexachlorobicyclo-(2.2.1)-5-heptene-2,3-dicarboxylic acid (which was prepared by the Diels-Alder reaction of hexachlorocyclopentadiene with maleic anhydride and then hydrolyzed), 152 parts of adipic acid and 61 parts of fumaric acid. About 40 parts of styrene and about 100 parts of the product produced by the esterification reaction were mixed together until complete solution was attained to give a clear, subsantially colorless solution of liquid polyester resin having a viscosity of about 10 poises at 25 degrees centigrade on a Gardner bubble viscometer and having a chlorine content of about 22.5 percent by weight of the total.

The following Examples 2 to 8 describe the preparation of the present invention's trivalent antimony salts of organic acids and their pentavalent derivatives.

*Example 2.—Preparation of Antimony Caprylate*
$(C_7H_{15}COO)_3Sb$

In 250 grams of distilled caprylic acid was suspended 29.2 grams (0.1 mole) of antimony oxide. The reaction mixture was heated under a nitrogen blanket resulting in the evolution of water. The theoretical evolution of water was realized at approximately the boiling point of the caprylic acid at which point the heating was discontinued.

The reaction mixture was cooled and then filtered, using a filter aid (Dicalite) to yield a yellow amber filtrate which was vacuum distilled (the temperature of the distilling mixture being maintained below 160 degrees centigrade) until the unreacted caprylic acid had distilled over. The resultant light brown colored residue, antimony caprylate, solidified at 52 degrees centigrade to a brownish white waxy solid. Analysis calculated for $C_{24}H_{45}O_6Sb$: Sb, 22.1. Found: 22.2.

*Example 3.—Preparation of Antimony Butyrate* $(C_3H_7COO)_3Sb$

In 250 grams of butyric acid was suspended 29.2 grams (0.1 mole) of antimony oxide. The reaction mixture was heated under a nitrogen blanket at reflux for two hours, before the butyric acid was allowed to distill over slowly. The brownish colored liquid residue, antimony butyrate, was found to hydrolyze rapidly in the presence of moist air. The antimony butyrate was used without further purification.

*Example 4.—Preparation of Antimony Cinnamate* $(C_6H_5CH=CHCOO)_3Sb$

A mixture of 250 grams of cinnamic acid and 29.2 grams (0.1 mole) of antimony oxide were heated together under a nitrogen blanket until the theoretical quantity of water had been distilled over.

The reaction mixture was vacuum distilled with the temperature kept below 200 degrees centigrade to remove the unreacted cinnamic acid. The amber colored liquid residue was poured while still hot and solidified upon cooling. This product, antimony cinnamate, was used without further purification.

*Example 5.—Preparation of Antimony Naphthenate*

A mixture of 250 grams of redistilled naphthenic acid (B.P. 180–200 degrees centigrade) and 29.2 grams (0.1 mole) of antimony oxide were heated together under nitrogen until the theoretical quantity of water had distilled over.

The brown reaction mixture was cooled, filtered (using Dicalite), and vacuum distilled to remove the unreacted naphthenic acid. The brown residual liquid was antimony naphthenate.

*Example 6.—Preparation of Antimony Caproate* $(C_5H_{11}COO)_3Sb$

In a five hundred milliliter flask fitted with thermometer, Barrett water trap, condenser, and nitrogen inlet tube was placed 250 milliliters of caproic acid and 29.2 grams (0.1 mole) of antimony oxide. The reaction mixture was heated to reflux under a nitrogen blanket until the theoretical amount of water had been evolved. The brownish-colored reaction mixture was filtered using Dicalite as a filter aid and the filtrate was then subjected to vacuum distillation to remove the excess caproic acid. The residue, a brownish liquid, was antimony caproate. Analysis calculated for $C_{18}H_{33}O_2Sb$: Sb, 26.1. Found: 25.7.

*Example 7.—Preparation of Antimony 2-Ethylcaproate* $(CH_3CH_2CH_2CH_2CH(C_2H_5)COO)_3Sb$ Antimony 2-ethyl caproate was prepared in the same manner as the preparation of antimony caprylate in Example 2 using instead of caprylic acid, 2-ethyl caproic acid. The product was also a brownish oil which tended to solidify on cooling.

*Example 8.—Preparation of Antimony Caprylate Dibromide* $(C_7H_{15}COO)_3SbBr_2$ To a solution of 11 grams of antimony caprylate (0.02 mole) in carbon tetrachloride was added 3.2 grams (0.02 mole) of bromine. The reaction mixture readily dissipated the bromine color up to the addition of 80 percent of the required bromine. The color from the last 20 percent of the bromine added was dissipated slowly on standing. The solvent was removed under water aspiration to yield a heavy orange oil. Further purification was not found to be feasible and the product was analyzed. Analysis calculated for $C_{24}H_{45}O_6SbBr_2$: Sb, 17.2. Found: 16.8.

The following examples illustrate the preparation of some of the esters as defined by this invention and made by the reaction of organic hydroxy compounds with antimony trioxide.

*Example 9.—Preparation of Tribenzyl Antimonite* $(C_6H_5CH_2O)_3Sb$

In a 500 milliliter three-necked flask with nitrogen inlet tube, Barrett water trap, condenser, and thermometer was placed 250 milliliters of benzyl alcohol and 29.2 grams (0.1 mole) of antimony trioxide. The reaction slurry was heated at reflux for 10 hours whereby most of the water was distilled over. The reaction mixture at the end of the reflux was found to be a water-white oil. After filtration the oil was subjected to vacuum distillation to remove the excess benzyl alcohol. The residue, tribenzyl antimonite, was a water-white oil which seemed to yellow slightly on standing.

*Example 10.—Preparation of Tris(n-Octyl) Antimonite* $(n-C_7H_{15}CH_2O)_3Sb$

A slurried mixture of 250 milliliters of n-octanol and 29.2 grams of antimony trioxide (0.1 mole) were heated together. At 190 degrees centigrade evolution of water was marked and water continued coming over as the temperature slowly rose. General refluxing was continued for 30 hours during which time water slowly was evolved from the reaction mixture and collected in a Barrett water trap. The reaction mixture was allowed to cool and then filtered. The filtrate was subjected to vacuum distillation to remove the excess n-octanol. The residue, tris(n-octyl) antimonite left after the distillation was a water-white oil with a slight yellow-green tint. Analysis calculated for $C_{24}H_{51}O_3Sb$: Sb, 24.0. Found: 23.8.

*Example 11.—Preparation of Tris(2-Ethylhexyl) Antimonite* $(CH_3CH_2CH_2CH_2CH(C_2H_5)CH_2O)_3Sb$ The equipment used was the same as in Example 9. The slurried reaction mixture of 29.2 grams (0.1 mole) of antimony trioxide and 250 milliliters of 2-ethylhexanol was heated to reflux, approximately 186 degrees centigrade giving a slow evolution of water. The reaction was allowed to run for 48 hours at reflux. After refluxing, the reaction mixture was filtered and the filtrate subjected to vacuum distillation to remove the excess 2-ethylhexanol. After distillation there remained 95 grams of residue, a slightly yellow tinted oil, tris(2-ethylhexyl) antimonite. Analysis calculated for $C_{24}H_{51}O_3Sb$: Sb, 24.0. Found: Sb, 23.8.

The following examples show the preparation of organic esters of antimonous acid and their derivatives by the reaction of an epoxy compound with antimony trichloride.

*Example 12.—Preparation of Tris(β-Chloropropyl) Antimonite* $(CH_3CHClCH_2O)_3Sb$ Into a three-necked one-liter glass reactor with a dropping funnel, stirrer, reflux condenser and a drying tube, was placed a solution of 115 grams (0.5 mole) of antimony trichloride in 200 cc. of dry toluene. There was then added slowly over a period of about 90 minutes with stirring, a solution of 87 grams (1.5 mole) of propylene oxide. The reaction was exothermic and continued to give off heat until the theoretical amount of propylene oxide had been added. The colorless solution was allowed to stand overnight; the solvent was then distilled off at reduced pressure to yield a heavy colorless oil, tris (β-chloropropyl) antimonite.

*Example 13.—Preparation of Tris(2,3-Dichloropropyl) Antimonite* $(CH_2ClCHClCH_2O)_3Sb$ Into the reaction apparatus described above in Example 12 was placed 45.6 grams (0.2 mole) antimony trichloride dissolved in 100 milliliters of dry toluene. To this was rapidly added with stirring 55.5 grams (0.6 mole) of epichlorohydrin. The reaction was exothermic and was continually stirred until it had cooled to room temperature. The resulting water-white reaction mixture was vacuum distilled to remove the solvent and yielded a water-white syrupy product, tris (2,3-dichloropropyl) antimonite.

*Example 14.—Preparation of Tris(β-Chloroethyl) Antimonite* $(CH_2ClCH_2O)_3Sb$

Ethylene oxide gas was bubbled through a ceramic gas sparger into a solution of 28.5 grams of antimony trichloride in 75 milliliters of dry toluene. An exothermic reaction ensued which lasted for 2.5 hours, at which time the reaction mixture had approached room temperature. The solvent was removed the next morning via water aspiration on a steam bath to yield a very light brown oil, which was easily hydrolyzed by moist air, tris (β-chloroethyl) antimonite.

*Example 15.—Preparation of Tris(β-Chlorobutyl) Antimonite* $(CH_3CH_2CHClCH_2O)_3Sb$ This reaction was run similarly to other members of this series. In 50 milliliters of dry toluene was dissolved 45.6 grams (0.2 mole) of antimony trichloride. To this was added dropwise, with stirring, 43.2 grams (0.6 mole) of butylene oxide. After the exothermic reaction mixture had cooled, the solvent was removed via water aspiration to yield a water-white residue, tris(β-chlorobutyl) antimonite.

*Example 16.—Preparation of Tris(2-Chloro-2-Phenylethyl) Antimonite* $(C_6H_5CHClCH_2O)_3Sb$ In 50 milliliters of dry toluene was dissolved 14.25 grams (0.0625 mole) of antimony trichloride. To this mixture, under nitrogen, was rapidly added 22.5 grams (0.1875 mole) of styrene oxide. After the initial exothermic reaction had cooled, the reaction mixture was heated for two hours at 100 degrees centigrade. The solvent was removed by water aspiration to yield a thick, heavy, syrupy oil, tris(2-chloro-2-phenylethyl) antimonite.

The following examples illustrate the preparation of pentavalent derivatives of organic esters of antimonous acid.

*Example 17.—Preparation of Tris(n-Octoxy) Antimony Dibromide* $(n-C_7H_{15}CH_2O)_3SbBr_2$ To 20.4 grams of tris(n-octyl) antimonite (0.04 mole) was added slowly with stirring and cooling, 6.4 grams of bromine (0.04 mole). The bromine color was rapidly dissipated during the addition giving as a final product, a heavy viscous yellow oil, tris(n-octoxy) antimony dibromide.

*Example 18.—Preparation of Tris(2-Ethylhexoxy) Antimony Dibromide* $(CH_3CH_2CH_2CH_2CH(C_2H_5)CH_2O)_3SbBr_2$ The reaction was carried out in a similar manner to Example 17 using instead antimony 2-ethylhexylate and bromine. A heavy viscous yellow oil, tris(2-ethylhexoxy) antimony dibromide was obtained. Quantities and reaction were exactly the same as in Example 13.

*Example 19.—Preparation of Tribenzoxy Antimony Dibromide* $(C_6H_5CH_2O)_3SbBr_2$ To 22.15 grams of antimony benzylate (0.05 mole) was slowly added with stirring and cooling 8 grams of bromine (0.05 mole). The reaction was vigorous and exothermic, and about halfway through the addition the reaction mixture thickened perceptibly. Benzene was then added in order to reduce the viscosity and the remainder of the bromine was then added. The benzene was vacuum distilled away to yield the dibromide adduct, tribenzoxy antimony dibromide.

*Example 20.—Preparation of Tris(β-Chloroethoxy) Antimony Dibromide* $(CH_2ClCH_2O)_3SbBr_2$ To 19 grams (0.053 mole) of the product of Example 14 was added 8.48 grams (0.053 mole) of bromine. A violent exothermic reaction occurs but with swirling the reaction moderated to yield an amber colored oil, the dibromo adduct, tris(β-chloroethoxy) antimony dibromide.

*Example 21.—Preparation of Tris(β-Chloropropoxy) Antimony Dibromide* $(CH_3CH_2ClCH_2O)_3SbBr_2$ The dibromo adduct of tris(β-chloropropyl) antimonite, tris(β-chloropropoxy) antimony dibromide was prepared in analogous fashion to tris(β-chloroethoxy) antimony dibromide in Example 20, and was similar in appearance.

*Example 22.—Preparation of Tris(β-Chlorobutoxy) Antimony Dibromide* $(CH_3CH_2CH_2ClCH_2O)_3SbBr_2$ To 22 grams (0.05 mole) of tris(β-chlorobutyl) antimonite was added dropwise 8 grams (0.05 mole) of bromide. During addition the reaction mixture was cooled yielding a heavy red brown oil. It was noted that only 70 percent of theoretical addition of bromide was absorbed by the antimonite. Fast addition of the bromine did permit the stoichiometric addition, however.

Certain of the foregoing described compounds and their methods of preparation are novel and are more fully described in separate applications S.N. 688,108, and S.N. 688,153, filed of even date herewith, now U.S. Patents Nos. 2,993,924 and 2,996,528, respectively.

The following table shows the results obtained by incorporating various antimony salts of organic acid flame-retardant agents of the present invention in the resin composition prepared in Example 1 above. For purposes of comparison, three percent of the antimony-containing additive was used in each example. The data was obtained by a test designated as ASTM D757–49. Curing was carried out in a manner as hereinafter described.

| Example No. | Resin 100 parts | Sb Fire Retarding Additive—Three parts | Burning Rate, Inches/minute |
|---|---|---|---|
| | Resin Prepared by Example 1. | None | 0.52 |
| 23 | do | Antimony caproate | 0.18 |
| 24 | do | Antimony naphthenate | 0.23 |
| 25 | do | Antimony caprylate | 0.20 |
| 26 | do | Antimony 2-ethylcaproate | 0.20 |
| 27 | do | Antimony butyrate | 0.18 |
| 28 | do | Antimony cinnamate | 0.22 |

The following table illustrates the use of the flame-retardant additives of the present invention which are organic esters of antimonous acid and their pentavalent derivatives. Also in each case below, for purposes of comparison, three percent of the additive was added to the mixture and the test carried out as in the table above. Curing was carried out in a manner as hereinafter described.

| Example No | Resin 100 Parts | Sb Fire Retarding Additive Compound | Burning Rate, Inches/Min. |
|---|---|---|---|
| | Prepared as in Example 1. | None | 0.52 |
| 29 | ----do---- | $(CH_2ClCH_2O)_3SbBr_2$ | 0.18 |
| 30 | ----do---- | $(CH_3CHClCH_2O)_3Sb$ | 0.18 |
| 31 | ----do---- | $(CH_3CHClCH_2O)_3Sb + .7\ Br_2$ | 0.22 |
| 32 | ----do---- | $(CH_2ClCHClCH_2O)_3Sb$ | 0.20 |
| 33 | ----do---- | $(CH_2ClCHClCH_2O)_3SbBr_2$ | 0.25 |
| 34 | ----do---- | $(CH_3CH_2CHClCH_2O)_3Sb$ | 0.20 |
| 35 | ----do---- | $(CH_3CH_2CHClCH_2O)_3SbBr_2$ | 0.21 |
| 36 | ----do---- | $n\text{-}(C_8H_{17}O)_3Sb$ | 0.20 |
| 37 | ----do---- | $n\text{-}(C_8H_{17}O)_3SbBr_2$ | 0.16 |
| 38 | ----do---- | $(CH_3CH_2CH_2CH_2CH(C_2H_5)CH_2O)_3SbBr_2$ | 0.23 |
| 39 | ----do---- | $(CH_3CH_2CH_2CH_2CH(C_2H_5)CH_2O)_3SbBr_2$ | 0.20 |
| 40 | ----do---- | $(C_6H_5CH_2O)_3Sb$ | 0.18 |

Although the above has been described mainly with reference to the product resulting from use of the adduct of hexachlorocyclopentadiene with maleic anhydride, other adducts of hexahalocyclopentadiene may be used, among which are the following: 1,4,5,6,7,7-hexachloro-2-methylbicyclo(2.2.1) - 5 - heptene-2,3-dicarboxylic anhydride, said compound and its method of preparation being disclosed and claimed in copending application SN 308,924, filed September 10, 1952, involving the reaction of hexachlorocyclopentadiene with citraconic anhydride; the mono-methyl ester of 1,4,5,6,7,7-hexachlorobicyclo-(2.2.1)-5-heptene-2,3-dicarboxylic acid, said compound being prepared by the method involving the reaction of hexachlorocyclopentadiene with maleic acid followed by esterification of the adduct so produced with the amount of methanol required to produce the mono-methyl ester; 3-(1,4,5,6,7,7-hexachlorobicyclo-(2.2.1) - 5 - heptene-2yl) methoxy-1,2-propanediol, said compound and its method of preparation being described in copending application SN 308,922, filed September 10, 1952, now U.S. Patent No. 3,007,958, involving the reaction of hexachlorocyclopentadiene with alpha allyl glycerol ether; 1,4,5,7-tetrachloro-6,7-difluorobicyclo-(2.2.1) - 5 - heptene-2,3-dicarboxylic acid, said compound and its method of preparation being disclosed and claimed in copending application SN 308,934, filed September 10, 1952, now abandoned, involving the reaction of 1,2,4,5-tetrachloro-1,3-difluorocyclopentadiene with maleic anhydride; 1,4,5,6,7,7-hexachlorobicyclo-(2.2.1)-5-heptene-2-acetic-2-carboxylic anhydride, said compound and its method of preparation being disclosed and claimed in copending application SN 308,923, filed September 10, 1952, now U.S. Patent No. 2,752,361, involving the reaction of hexachlorocyclopentadiene with itaconic anhydride; and 1,4,5,6,7,7-hexachlorobicyclo-(2.2.1)-2-heptene-2,3-dicarbonyl chloride; said compound and its method of preparation being disclosed and claimed in copending application SN 450,216 filed August 16, 1954, now U.S. Patent No. 2,812,347, involving the reaction of hexachlorocyclopentadiene with fumaryl chloride.

Various other adducts of hexahalocyclopentadiene may also be employed particularly in the cross linking agent such as: diallyl-1,4,5,6,7,7-hexachlorobicyclo-(2.2.1)-5-heptene-2,3-dicarboxylate; diallyl-1,4,5,6,7,7-hexachloro-2-methylbicyclo-(2.2.1) - 5 - heptene-2,3-dicarboxylate; diallyl-1,2,4,5,6,7,7-heptachlorobicyclo-(2.2.1) - 5 - heptene-2,3-dicarboxylate; and triallyl-1,4,5,6,7,7-hexachlorobicyclo - (2.2.1) - 5 - heptene-2-acetate-2,3-carboxylate. These compounds can be prepared by reacting hexachlorocyclopentadiene with the indicated dicarboxylic acid and esterifying the resultant product with an unsaturated alcohol such as allyl alcohol.

Still other adducts of hexahalocyclopentadiene may be employed, for instance, the adducts formed with unsaturated polycarboxylic acids, such as, fumaric, itaconic, acetylene dicarboxylic and esters and halogen substituted derivatives thereof, etc.; unsaturated polyhydric alcohols such as, butene-diol, pentene-diol etc.; also unsaturated hydroxy ethers such as, allyl or vinyl glycerol ethers, allyl or vinyl pentaerythritol ethers, etc.; and, still other chemical compounds comprising an ethylenic or acetylenic linkage which are not rendered unreactive in the polyester chain by their chemical combination into the polyester chain by way of other functional groups.

All of the foregoing examples typify the first type of the first class of polyester compositions previously described.

The following examples which typify the second type of the first class of polyester composition previously described illustrate the use of additives of the present invention with polyester resin compositions where the acid component of the ester is directly chlorinated. The table, following the examples, shows the effect produced on the burning rate of this type of polyester. Each of the resins were made by mixing 100 parts of a tetrachlorophthalic anhydride based styrenated polyester resin with two percent by weight of a mixture of 50 percent benzoyl peroxide and 50% tricresylphosphate and the designated weight of the antimony additives as shown. The resin used was a clear, light-amber-colored, thick liquid having a slight odor and having a viscosity at 25 degrees centigrade of 3700–4400 centipoises; it has a specific gravity of 1.270–1.280 at 25 degrees centigrade and its refractive index at this temperature is 1.5566; it has a styrene content of 28.0 percent and an acid number of 17–19. Curing was obtained by first heating in a bath maintained at 50 degrees centigrade for 24 hours followed by heating in an oven maintained at approximately 80–90 degrees centigrade for 24 hours.

This same catalyst and the same curing conditions were employed throughout in preparing the finally cured resins of this invention. Burning rate is measured by a test designated as ASTM D 757–49.

| Ex. No. | Resin, 100 parts | Sb additive 3 parts | Burn. Rate, in./min. |
|---|---|---|---|
| 41 | Tetrachlorophthalic anhydride based resin. | None | 0.32 |
| 42 | ----do---- | $(n\text{-octyl-}O)_3Sb$ | 0.25 |
| 43 | ----do---- | $(C_7H_{15}COO)_3Sb$ | 0.25 |
| 44 | ----do---- | $(CH_3CHClCH_2O)_3Sb$ | 0.20 |
| 45 | ----do---- | $(C_6H_5\text{-}CH=CH\text{-}COO)_3Sb$ | 0.23 |
| 46 | ----do---- | $(CH_2ClCHClCH_2O)_3SbBr_2$ | 0.18 |

The following Examples 47 and 48 typifying the third type of the first class of compositions previously described, illustrate the advantages to be obtained by adding and curing in the manner previously described a flame-resistant agent of the present invention with polyester resins which do not themselves contain combined chlorine, but in which however the cross-linking agent is chlorinated. The polyester resin used in both of these examples was the same and was a phthalic acid, maleic anhydride, ethylene glycol, based resin with dichlorostyrene used as the cross-linking agent. The data shows the properties obtained.

| Example | Flame Resistant Agent | Additive in parts per hundred of resin | ASTM D 757-49 Burning Rates, in. per min. |
|---|---|---|---|
| 47 | | | 0.59 |
| 48 | Antimony caprylate | 3 | 0.41 |

The following examples illustrate the advantages to be obtained by adding the present flame-resistant agents to polyester resins which themselves do not contain combined chlorine. The polyester resin was a standard phthalic acid based polyester resin, having a light straw color, a specific gravity and viscosity at 77 degrees fahrenheit of 1.13 and 675 centipoises Brookfield respectively and a styrene content of 34 percent. The data show the properties obtained.

| Ex. No. | Resin 100 parts | Sb Additive 3 parts | Burning rate, in. per min. |
|---|---|---|---|
| 49 | Phthalic acid based resin +5% chlorinated Paraffin (70% chlorine). | None | 0.95 |
| 50 | Phthalic acid based resin + no halogen containing additive. | $(C_7H_{15}COO)_3Sb$ | 0.85 |
| 51 | Phthalic acid based resin +5% Chlorinated Paraffin (70% chlorine). | $(C_7H_{15}COO)_3Sb$ | 0.79 |
| 52 | ---do--- | $(C_7H_{15}COO)_3Sb^1$ | 0.77 |
| 53 | ---do--- | $(CH_3CHCl-CH_2O)_3Sb$ | 0.79 |
| 54 | ---do--- | $(C_6H_5CH=CHCOO)_3Sb$ | 0.83 |
| 55 | ---do--- | $(n-Octyl-O)_3Sb$ | 0.82 |

[1] (5 parts).

The above table shows that the addition of antimony additives of this invention to a non-chlorine containing polyester will itself considerably improve the flame resisting properties of such polyester. However, this table also shows that when the antimony additives of this invention are used in conjunction with a fire retardant additive such as chlorinated wax, the flame resisting properties are improved to an even greater extent.

In general, it can readily be noted from surveying the burning rates of the resins of Examples 23 through 55 inclusive, that the more chlorine present in the resin, the greater the fire resistance of such resins, e.g. the resin of Example 51, with a chlorine contest of approximately 3.5 percent has a burning rate of 0.79 in./min. whereas the resin of Example 43, in which the same antimony additive is used, but which contains approximately 20 percent chlorine, has a burning rate of only 0.25 in./minute.

The polymerizable unsaturation of the polyesters of this invention may be obtained by introducing into the polyester chain a reactive unsaturated chemical ingredient which is capable of rendering the polyester copolymerizable even after it is in chemical combination in the polyester molecule. A particularly suitable material for this use is maleic anhydride; however any unsaturated polycarboxylic compound, such as substituted or unsubstituted acids, anhydrides and acid halides, or polyhydric alcohols, or, esters thereof, containing a plurality of esterifiable groups, and capable of esterification without losing its ability to copolymerize with olefinic cross-linking agents may be employed.

Another method of providing for copolymerizable unsaturation in the polyester chain which may be employed involves: effecting the diene synthesis of hexachlorocyclopentadiene with a polybasic alcohol or acid or ester, or equivalents thereof, which contains at least two olefinic linkages, one of which is reactive in the diene synthesis, while the others which are unreacted, are capable of being copolymerizable in the cross-linking reaction. Among the materials which are useful for this purpose are acetylenic compounds and di-olefinic and poly-olefinic compounds.

Having thus described our invention, what we claim and desire to secure by Letters Patent is:

1. A polymerizable mixture comprising (A) a polymerizable unsaturated polyester of ingredients comprising (1) a polycarboxylic compound and (2) a polyhydric alcohol; (B) a copolymerizable ethylenically unsaturated monomer, and (C) a flame retarding agent which has the formula:

wherein Sb is trivalent antimony and R is selected from the group consisting of anions of organic acids having less than thirteen carbon atoms and anions of alcoholates and mixtures thereof, wherein said flame retarding agent is soluble in the mixture of (A) and (B) and is present in an amount at least about 0.5% by weight of A and B.

2. A mixture according to claim 1, wherein a portion of said polycarboxylic compound (1) comprises the adduct of hexahalocyclopentadiene and a polycarboxylic compound containing aliphatic carbon to carbon unsaturation, wherein the halogen is selected from the group consisting of chlorine, bromine, fluorine and mixtures thereof.

3. A mixture according to claim 1, wherein a portion of said polyhydric alcohol (2) comprises the adduct of hexalocyclopentadiene and a polyhydric alcohol containing aliphatic carbon to carbon unsaturation, wherein the halogen is selected from the group consisting of chlorine, bromine, fluorine and mixtures thereof.

4. A mixture according to claim 2 wherein the adduct is 1,4,5,6,7,7-hexachlorobicyclo-(2.2.1)-5-heptene-2,3-dicarboxylic acid.

5. A mixture according to claim 2 wherein the adduct is 1,4,5,6,7,7-hexachlorobicyclo-(2.2.1)-5-heptene-2,3-dicarboxylic anhydride.

6. A mixture according to claim 1 wherein a portion of said polycarboxylic compound (1) comprises tetrachlorophthalic anhydride.

7. A mixture according to claim 1 wherein said copolymerizable ethylenically unsaturated monomer is selected from the group consisting of styrene and dichlorostyrene.

8. A mixture according to claim 1 having a minor proportion of chlorinated paraffin wax added thereto.

9. A mixture according to claim 1 when polymerized to an infusible, insoluble state.

10. A mixture according to claim 1 wherein the substituent R in the flame retarding agent (C) is an anion of an organic acid having less than thirteen carbon atoms.

11. A mixture according to claim 10 wherein the substituent R in the flame retarding agent (C) is caproate.

12. A mixture according to claim 1 wherein the substituent R in the flame retarding agent (C) is an anion of an alcoholate.

13. A mixture according to claim 12 wherein the flame retarding agent (C) is tris (2-ethylhexyl) antimonite.

14. A polymerizable mixture comprising (A) a polymerizable unsaturated polyester of ingredients comprising (1) a polycarboxylic compound and (2) a polyhydric alcohol; (B) a co-polymerizable ethylenically unsaturated monomer, and (C) a flame retarding agent which has the formula:

wherein Sb is pentavalent antimony and R is selected from the group consisting of anions of organic acids having less than thirteen carbon atoms and anions of alcoholates and mixtures thereof, and wherein X is a halogen selected from the group consisting of fluorine, chlorine, bromine and mixtures thereof; wherein said flame retarding agent is soluble in the mixture of (A) and (B) and is present in an amount at least 0.5 percent by weight of A and B.

15. A mixture according to claim 14, wherein a portion of said polycarboxylic compound (1) comprises the adduct of hexahalocyclopentadiene and a polycarboxylic compound containing aliphatic carbon to carbon unsaturation, wherein the halogen is selected from the group consisting of chlorine, bromine, fluorine and mixtures thereof.

16. A mixture according to claim 14, wherein a portion of said polyhydric alcohol (2) comprises the adduct of hexahalocyclopentadiene and a polyhydric alcohol containing aliphatic carbon to carbon unsaturation, wherein the halogen is selected from the group consisting of chlorine, bromine, fluorine and mixtures thereof.

17. A mixture according to claim 15, wherein the adduct is 1,4,5,6,7,7 - hexachlorobicyclo-(2.2.1)- 5 -heptene-2,3-dicarboxylic acid.

18. A mixture according to claim 15, wherein the adduct is 1,4,5,6,7,7 - hexachlorobicyclo-(2.2.1) - 5-heptene-2,3-dicarboxylic anhydride.

19. A mixture according to claim 14, wherein a portion of said polycarboxylic compound (1) comprises tetrachlorophthalic anhydride.

20. A mixture according to claim 14, wherein said copolymerizable ethylenically unsaturated monomer is selected from the group consisting of styrene and dichlorostyrene.

21. A mixture according to claim 14, having a minor proportion of a chlorinated paraffin wax added thereto.

22. A mixture according to claim 14, when polymerized to an infusible, insoluble state.

23. A mixture according to claim 14 wherein the substituent R in the flame retarding agent (C) is an anion of an organic acid having less than thirteen carbon atoms.

24. A mixture according to claim 23 wherein the substituent X in the flame retarding agent (C) is bromine.

25. A mixture according to claim 14 wherein the substituent R in the flame retarding agent (C) is an anion of an alcoholate.

26. A mixture according to claim 25 wherein the substituent X in the flame retarding agent (C) is bromine.

27. A polymerizable mixture comprising (A) a polymerizable unsaturated polyester of ingredients comprising (1) a polycarboxylic compound and (2) a polyhydric alcohol; (B) a copolymerizable ethylenically unsaturated monomer, and (C) a flame retarding agent which has a formula selected from the group ocnsisting of:

and

wherein Sb is antimony, R is selected from the group consisting of anions of organic acids having less than thirteen carbon atoms and anions of alcoholates and mixtures thereof, and wherein X is a halogen selected from the group consisting of fluorine, chlorine, bromine and mixtures thereof; wherein said flame retarding agent is soluble in the mixture of (A) and (B) and is present in an amount at least 0.5 percent by weight of A and B.

References Cited in the file of this patent

UNITED STATES PATENTS

| | | |
|---|---|---|
| 433,215 | Rabinowicz | July 29, 1890 |
| 2,299,612 | Clayton et al. | Oct. 20, 1942 |
| 2,413,163 | Bacon | Dec. 24, 1946 |
| 2,420,644 | Athy et al. | May 20, 1947 |
| 2,640,000 | Seyb et al. | Nov. 17, 1959 |
| 2,913,428 | Schoepfle et al. | Nov. 17, 1959 |
| 2,924,532 | Dereich | Feb. 9, 1960 |

FOREIGN PATENTS

| | | |
|---|---|---|
| 478,587 | Great Britain | Jan. 20, 1938 |

OTHER REFERENCES

Ind. & Eng. Chem., vol. 46 No. 8, August 1954, pages 1628–1632.

UNITED STATES PATENT OFFICE
CERTIFICATE OF CORRECTION

Patent No. 3,031,425 April 24, 1962

Blaine O. Schoepfle et al.

It is hereby certified that error appears in the above numbered patent requiring correction and that the said Letters Patent should read as corrected below.

Column 3, line 65, for "2-chlorobutoxy)" read -- (2-chlorobutoxy) --; column 8, line 34, for "22" read -- 22.2 --; lines 36 and 38, for "bromide", each occurrence, read -- bromine --; same column 8, line 44, for "688,153" read -- 688,143 --; column 9, in the table, third column, opposite "Example No. 38" for the right-hand portion of the formula reading "$SbBr_2$" read -- Sb --; line 26, after "1952," insert -- now U.S. Patent 2,779,769 --; column 12, line 33, for "hexalocyclopentadiene" read -- hexahalocyclopentadiene --.

Signed and sealed this 22nd day of June 1965.

(SEAL)
Attest:

ERNEST W. SWIDER
Attesting Officer

EDWARD J. BRENNER
Commissioner of Patents